Dec. 26, 1950   R. F. DUNBAR   2,536,002
STARTER GEARING FOR INTERNAL-COMBUSTION ENGINES
Filed June 13, 1949

WITNESS:
Esther M. Stockton

INVENTOR.
Richard F. Dunbar
BY
Clinton S. Janes
ATTORNEY

Patented Dec. 26, 1950

2,536,002

UNITED STATES PATENT OFFICE 2,536,002

STARTER GEARING FOR INTERNAL-COMBUSTION ENGINES

Richard F. Dunbar, Elmira Heights, N. Y., assignor to Bendix Aviation Corporation, Elmira Heights, N. Y., a corporation of Delaware Application June 13, 1949, Serial No. 98,698

3 Claims. (Cl. 74—7)

The present invention relates to starter gearing for internal combustion engines, and more particularly to that type of gearing which is arranged to engage an engine gear when the starting motor is energized, and to automatically disengage therefrom when the engine becomes self-operative.

Starter drives of this character are being called upon to operate reliably over increasingly wide ranges of ambient temperature, and especially at very low temperatures when the lubricant may assume a substantially solid state. Engagement of the drive under such circumstances is secured by so designing the longitudinally movable parts as to increase their polar moment of inertia without a corresponding increase in mass, as taught for instance in the patent to Buxton et al. 2,469,792, but considerations of space and cost provide a practical limit to such design factors.

It is an object of the present invention to provide a novel engine starter drive in which the congelation of lubricant which interferes with the traversal of the drive pinion into mesh with the engine gear also provides a factor which assists in effecting such traversal.

It is another object to provide such a starter drive in which, during cranking of the engine, the endwise thrusts of the rotating parts are balanced out, so as to eliminate the necessity of any extraneous thrust bearing.

It is another object to provide such a drive in which the drive pinion is supported in a stationary bearing instead of on a rotating shaft, so that the rotational friction of the bearing assists in causing traversal of the pinion.

It is another object to provide such a device in which the polar moment of inertia of the parts to be translated is large in relation to their combined mass.

Further objects and advantages will be apparent from the following description taken in connection with the accompanying drawing in which.

Figure 1:
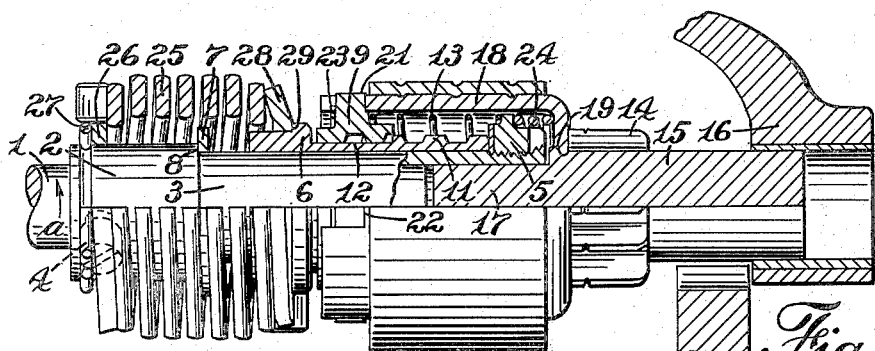
Fig. 1 is a side elevation partly broken away and in section of a preferred embodiment of the invention showing the parts in normal or idle position.

In Fig. 1 of the drawing there is illustrated a power shaft 1 which is preferably the extended armature shaft of a starting motor not illustrated. A cylindrical sleeve 2 having a smooth reduced portion 3 is rigidly mounted on power shaft 1 as indicated at 4, and is provided with a stop nut 5 fixedly mounted on the end of the reduced portion 3.

A screw shaft 6 is slidably journalled on the reduced portion 3 of sleeve 2, its longitudinal travel thereon being limited by the stop nut 5 on the one hand, and on the other hand by a thrust washer 7 seated against the shoulder 8 formed by the reduced portion of the sleeve 2.

A control nut 9 is mounted on the screw shaft 6 for engagement with the threads 11 of the screw shaft, but normally positioned on a smooth portion 12 of the screw shaft by an anti-drift spring 13 located between the control nut and the stop nut 5.

A pinion 14 is provided with an extended hub portion 15 journalled in an outboard bearing 16 which is attached to the motor housing not illustrated. Pinion 14 also has a reduced extended hub portion 17 which is journalled within the reduced portion 3 of the sleeve 2. A barrel member 18 is rigidly mounted at one end on the pinion 14 as indicated at 19, and at its other end is anchored to the control nut 9 as by means of lugs 21 on the nut seated in slots 22 in the barrel and retained by a lock ring 23. A re-entry spring 24 seated on the stop nut 5 serves to insure the entry of the control nut 9 upon the threads 11 of the screw shaft upon rotation of the screw shaft in the direction of the arrow $a$.

A yielding driving connection between the sleeve 2 and the screw shaft 6 is provided in the form of a torsion and compression spring 25 connected to the sleeve 2 by means of anchor plate 26 non-rotatably mounted on said sleeve and retained by a lock wire 27, and by means of an anchor plate 28 non-rotatably mounted on the shaft 6 against a shoulder 29. Spring 25 normally holds the screw shaft 6 against the stop nut 5, but when compressed by the screw-jack action of the screw shaft and control nut 9, is compressed as shown in Fig. 2 so as to permit the thrust washer 7 to provide an auxiliary frictional connection between the sleeve and screw shaft.

Figure 2:
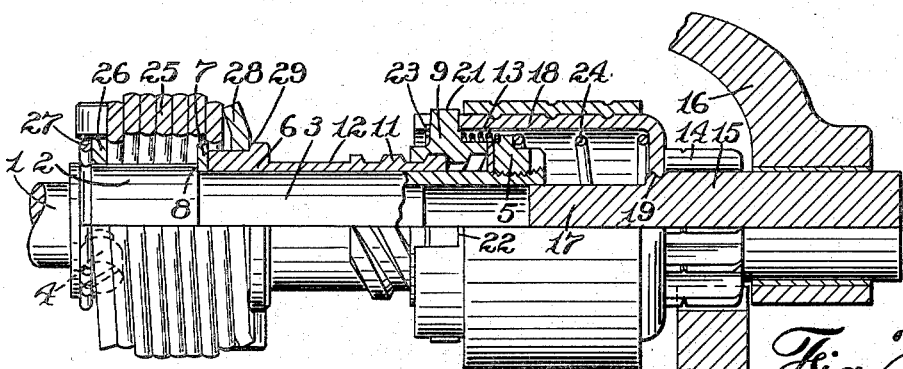
Fig. 2 is a similar view showing the parts in cranking position.
Figure 3:
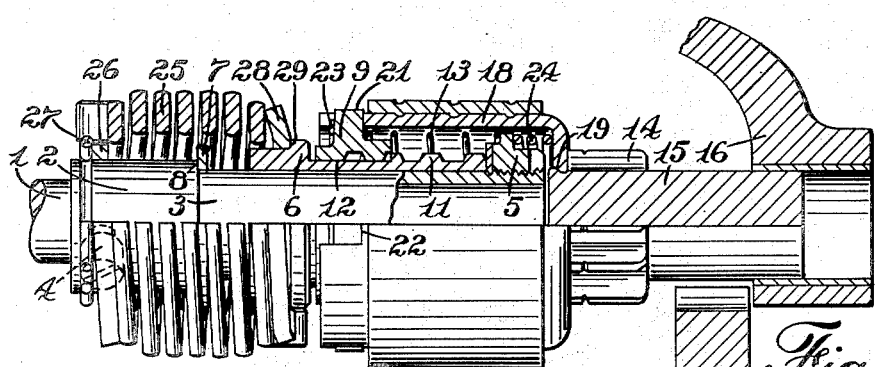
Figure 3 is a view similar to Fig. 1 of a modified form of the invention.

In Fig. 3 of the drawing the parts are the same as illustrated and described in connection with Figs. 1 and 2, except that the pilot bearing 17 of the pinion in the sleeve 2 as shown in Figs. 1 and 2 is omitted, the power shaft 1 being coextensive with the sleeve 2. In this embodiment of the invention the pinion 14 is maintained in alignment with the power shaft 1 by means of the barrel 13, control nut 9, screw shaft 6 and sleeve 2.

In operation, starting with the parts in positions illustrated in Fig. 1, rotation of the power shaft in the direction of the arrow *a* is transmitted through the sleeve 2 and the spring 25 to the screw shaft 6. Rotation of the nut 9 is resisted by the inertia of the nut, its associated barrel 13 and pinion 14, so that the nut and pinion assembly is traversed to the right to the position illustrated in Fig. 2, where the further travel is arrested by the stop nut 5. The screw shaft 6 is then thrust back against the thrust washer 7 by the screw-jack action of the screw shaft and control nut 9, after which the torque of the driving shaft is transmitted to the pinion through the spring 25 and through the friction connection including the thrust washer 7.

If the ambient temperature is very low, the lubricant on the screw shaft may become congealed to such an extent as to offer considerable resistance to the traversal of the nut thereon. When this occurs, however, the lubricant in the bearing 16 similarly resists the rotation of the pinion 14 which assists in insuring traversal of the pinion into mesh with the engine gear. The resistance in the bearing 16 due to congealed oil therefore tends to balance the effect of the congealed oil on the screw threads 11 and thus secure reliable operation of the device under all temperature conditions.

Although certain structure has been shown and described in detail, it will be understood that other embodiments are possible and changes may be made in the design and arrangement of the parts without departing from the spirit of the invention.

I claim:

1. In an engine starter drive a power shaft, a fixed bearing in alignment with the power shaft, a pinion having a smooth extended hub portion slidably journalled in said bearing for longitudinal movement into and of mesh with a gear of an engine to be started, and means for actuating the pinion from the power shaft including a sleeve fixed to the power shaft, a screw shaft slidably journalled on the sleeve, an abutment for the screw shaft on the end of the sleeve adjacent the pinion, a yielding driving connection from the sleeve to the screw shaft, urging the screw shaft against said abutment, a control nut threaded on the screw shaft for longitudinal movement into engagement with said abutment, and a barrel member surrounding the screw shaft, control nut and abutment, rigidly connected at its ends to the control nut and pinion respectively, said pinion having a second smooth extended hub portion of substantially smaller diameter than the first-mentioned hub portion, and having a sliding bearing fit in the end of the sleeve.

2. An engine starter drive as set forth in claim 1, in which the pinion is arranged to move toward said bearing as it enters into mesh with the engine gear, and the abutment on the screw shaft is so located as to arrest the meshing movement of the control nut, barrel and pinion, and thereby prevent the pinion from having thrust engagement with the bearing.

3. An engine starter drive as set forth in claim 2 including further a second abutment on the sleeve limiting the compression of the yielding driving connection by the screw shaft, and forming a frictional connection between the sleeve and screw shaft.

RICHARD F. DUNBAR.

REFERENCES CITED

The following references are of record in the file of this patent:

UNITED STATES PATENTS

| Number | Name | Date |
|---|---|---|
| 2,322,964 | Kearney | June 29, 1943 |
| 2,407,158 | Jones | Sept. 3, 1946 |

FOREIGN PATENTS

| Number | Country | Date |
|---|---|---|
| 500,525 | France | Mar. 16, 1920 |